(12) United States Patent
Wietzel et al.

(10) Patent No.: US 7,044,046 B2
(45) Date of Patent: May 16, 2006

(54) HYDRAULIC SERVO-ASSISTED STEERING SYSTEM FOR VEHICLES AND A CONTROLLING METHOD FOR A STEERING SYSTEM OF THIS TYPE

(75) Inventors: Uwe Wietzel, Schechingen (DE); Rainer Schaenzel, Essingen (DE); Andreas Kruttschnitt, Heidenheim (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/496,408

(22) PCT Filed: Nov. 21, 2002

(86) PCT No.: PCT/EP02/13049

§ 371 (c)(1),
(2), (4) Date: Sep. 14, 2004

(87) PCT Pub. No.: WO03/043870

PCT Pub. Date: May 30, 2003

(65) Prior Publication Data

US 2005/0039450 A1  Feb. 24, 2005

(30) Foreign Application Priority Data

Nov. 23, 2001 (DE) ............... 101 57 527
Nov. 23, 2001 (DE) ............... 101 57 548

(51) Int. Cl.
*B62D 5/06* (2006.01)
(52) U.S. Cl. ......................... 91/368; 700/41
(58) Field of Classification Search ............ 91/368, 91/375 A, 375 R; 701/41

See application file for complete search history.

(56) References Cited

U.S. PATENT DOCUMENTS

| 4,708,596 | A |   | 11/1987 | Palm et al. |
| 4,765,426 | A |   | 8/1988 | Shimizu |
| 4,860,846 | A |   | 8/1989 | Uchida et al. |
| 4,875,542 | A |   | 10/1989 | Uchida et al. |
| 5,107,752 | A |   | 4/1992 | Elser et al. |
| 5,184,297 | A | * | 2/1993 | Graber et al. ........ 701/41 |
| 5,339,917 | A |   | 8/1994 | Eberhart |
| 5,575,193 | A |   | 11/1996 | Bareis et al. |
| 5,628,187 | A |   | 5/1997 | Göllner |
| 5,982,137 | A |   | 11/1999 | Endo |
| 6,195,601 | B1 |  | 2/2001 | Spillner et al. |
| 6,220,385 | B1 |  | 4/2001 | Bohner et al. |

(Continued)

FOREIGN PATENT DOCUMENTS

DE  34 20 519  12/1985

(Continued)

*Primary Examiner*—Thomas E. Lazo
(74) *Attorney, Agent, or Firm*—Kenyon & Kenyon LLP

(57) ABSTRACT

For a hydraulic servo-assisted steering system for motor vehicles, classifying storage of the respectively measured, actual valve characteristic curves is provided and, corresponding to this, energization characteristic curves for the magnetic actuator of the converter are provided, which may be paired in a classified manner in order to compensate for deviations from a predefined set valve characteristic curve, and a testing method for such a hydraulic servo-assisted steering system is provided, in which the loading pressure of the servo actuator is influenced as a function of an input steering torque and in a speed-dependent manner, the speed-dependent influence being effected via the electro-hydraulic converter, whose energization may be set in a manner superimposed on the speed-dependent definition with regard to the correction of tolerances.

19 Claims, 4 Drawing Sheets

U.S. PATENT DOCUMENTS

2004/0096334 A1   5/2004   Aldinger et al.

FOREIGN PATENT DOCUMENTS

| DE | 34 22 089 | 12/1985 |
| DE | 37 10 591 | 10/1987 |
| DE | 37 31 258 | 4/1988 |
| DE | 37 44 346 | 7/1988 |
| DE | 38 21 943 | 1/1989 |
| DE | 38 33 881 | 4/1990 |
| DE | 39 29 175 | 3/1991 |
| DE | 41 34 850 | 4/1992 |
| DE | 42 01 311 | 2/1993 |
| DE | 41 38 885 | 6/1993 |
| DE | 42 13 980 | 11/1993 |
| DE | 42 20 624 | 1/1994 |
| DE | 42 40 076 | 6/1994 |
| DE | 195 24 669 | 1/1997 |
| DE | 195 27 073 | 1/1997 |
| DE | 195 39 088 | 4/1997 |
| DE | 196 49 347 | 6/1998 |
| DE | 198 07 024 | 8/1998 |
| DE | 198 05 015 | 7/1999 |
| DE | 198 20 381 | 11/1999 |
| DE | 198 33 460 | 1/2000 |
| DE | 198 55 405 | 6/2000 |
| DE | 199 08 357 | 8/2000 |
| DE | 199 35 073 | 2/2001 |
| DE | 100 15 923 | 10/2001 |
| DE | 101 04 851 | 8/2002 |

* cited by examiner

HYDRAULIC SERVO-ASSISTED STEERING SYSTEM FOR VEHICLES AND A CONTROLLING METHOD FOR A STEERING SYSTEM OF THIS TYPE

FIELD OF THE INVENTION

The present invention relates to a hydraulic servo-assisted steering system for motor vehicles and to a setting method for such a steering system, e.g., for compensating for deviations, caused by production tolerances, from a set steering behavior of such vehicle servo steering systems.

BACKGROUND INFORMATION

Servo-assisted steering systems of the above-mentioned type are described, for example, in German Published Patent Application No. 42 20 624. In these, the torque-dependent actuation of the servo actuator assisting the steering force is controlled by a hydraulic steering valve in the form of a rotary slide valve. For this purpose, the rotary slide of the rotary slide valve is firmly connected to an input element formed by the steering shaft so as to rotate with it, and the input element is connected so as to rotate with a limited rotational angle and dependent on the torque with respect to an output element connected to the steering mechanism via a torsion spring. The output element is in turn fixed against rotation to a control bush which is coaxial with the rotary slide and can rotate with respect to the latter. Depending on the torque-dependent rotation of the control bush with respect to the rotary slide, the result is different degrees of overlap between the corresponding connection cross sections of these, and thus different opening cross-sections in the feed and discharge of the servo actuator. The torque assistance via the torsion spring has speed-dependent torque assistance superimposed on it and, for this purpose, the control bush is acted on axially at the end by a reaction piston which, in relation to the input element and to the rotary slide, is supported firmly such that it cannot rotate but can be displaced axially and is spring loaded in the direction of the control bush. The mutually facing ends of the control bush and of the reaction piston have displacement surfaces which are inclined in opposite directions, between which there are rolling elements, so that, depending on the torque-dependent rotation of the control bush with respect the rotary slide or the input element, as a result of the rolling elements running onto the displacement surfaces, the result is a displacement of the reaction piston counter to the force of the latter in the direction of the spring acting on the control bush.

The chamber which accommodates the spring is designed as a pressure chamber and is to be connected to the high-pressure side of the hydraulic circuit such that the reaction piston, assisting the loading spring force, is pressure-loaded in the direction of the control bush, so that as the pressure increases, the assistance between input and output element becomes rotationally more stiff. The pressure supplied to the reaction chamber is controlled as a function of speed via an electro-hydraulic converter with an actuating magnet that acts on a hydraulic valve arrangement.

A steering valve of this type has an initial position at speeds around zero which corresponds to a position of maximum servo action, such as is desired for parking, for example. Starting from this position, the steering becomes rotationally stiffer with increasing speed as a result of the superimposed pressure loading of the reaction piston, in the same direction as he spring force, so that a higher input torque has to be applied for steering movements. German Published Patent Application No. 42 01 311 describes a servo-assisted steering system with the same basic structure, but the steering valve has an initial position which corresponds to a position of minimum servo action, such as is the intention for higher speed, for example, in order to avoid a woolly steering feel by an appropriately rotationally stiff steering system, and to obtain improved feedback from the roadway. The reaction piston is pressurized in the direction opposite to the spring force as a function of speed, specifically such that, at speeds around zero, the result is the intended high servo action, in which the steering torque input on the input side is assisted in a relatively rotationally soft manner because the reduced stiffening of the torsion spring via the spring-loaded reaction piston as a result of the pressurization.

Depending on the initial position, therefore, the pressurization of the reaction piston can be used to adjust the steering system in the hard direction with increasing speed, with the pressurization in the same direction as the spring force or, with pressurization in the opposite direction, to make the steering system rotationally softer with reducing speed, starting from its hard, rotationally stiff setting, as is desired for parking.

Irrespective of the respective constructional design in this regard, on the steering valve side, as a result of the rotary slide and the superimposed, speed-dependently operating actuating and control elements, a relatively long function chain with alternating influences is provided and, irrespective of the testing and setting of the individual functional elements, tolerances can occur which, in particular in the context of mass production, lead to scatter with respect to the respective valve characteristic curve, which also become noticeable in vehicles with the same equipment level and impart a different steering feel. Such mass-production scatter leads to complaints in the case of manufacturers of vehicles, and likewise in the case of end customers, in particular if these are sensed as deviations from the usual.

Since the checking of the steering in its entirety and in the overall assembly in the vehicle is barely possible with tolerable effort, but in particular access to the hydraulic elements cannot be implemented without dismantling, it is necessary to fall back on specific setting devices in testing the individual elements. With their aid, the electro-hydraulic converter is set by mechanical intervention to a converter characteristic curve which corresponds in the best possible manner to the set characteristic curve of the steering valve and which, therefore, as based on the effective coil current of the converter, results in a reaction pressure, i.e., a build-up of pressure in the reaction chamber partly bounded by the reaction piston, as a function of speed, which corresponds to the respectively intended servo action illustrated by the set valve characteristic curve.

A calibration of this type of the electro-hydraulic converter is influenced as such by the tolerances of the associated setting device and in the pairing with the hydraulic valve arranged downstream, in particular a rotary slide valve, has superimposed on it tolerances of the latter and those of a steering mechanism arranged downstream. Subsequent intervention possibilities, in the sense of readjustment by mechanical intervention in the hydraulic steering valve, are virtually not provided, and thus subsequent changes are at most possible with considerable effort.

It is an aspect of the present invention to provide for, e.g., with little effort, and, e.g., which may also be managed well in mass production, limiting the tolerances in relation to the set valve characteristic curve associated with the intended steering behavior. A further aspect of the present invention is to provide a testing method which may make it possible, e.g., with little effort and e.g., one which may also be managed well in mass production, of limiting the tolerances in relation to the set steering characteristic curve associated with an intended steering behavior and of permitting the set valve characteristic curve corresponding to this.

SUMMARY

According to the an example embodiment of the present invention, a plurality of energization characteristic curves are assigned to the electro-hydraulic converter and the dependence, expressed in the valve characteristic curve, between steering input torque, e.g., steering wheel actuating torque, and the pressure also influenced by the electro-hydraulic converter is used for the purpose of correcting deviations from the set valve characteristic curve by pairing an energization characteristic curve—from the family of possible energization characteristic curves of the converter—which may compensate in the best manner possible for the deviation of the current, e.g., the actual, valve characteristic curve, from the set valve characteristic curve.

According to an example embodiment of the present invention, appropriate energization characteristic curves of the electro-hydraulic converter and assigned to the controller or the converter may be stored or implemented.

Immediate assignment to the controller offers the possibility, starting from the controller, of already energizing the converter in accordance with the respective energization characteristic curve. Assignment to the converter offers the possibility, starting from the latter, to call an energization with a respectively predefined current intensity in the controller or, on the part of the converter, to vary the energization predefined by the controller in a corrective manner, it being possible for this purpose for the converter to be assigned hardware, for example, in the form of an appropriately populated adapter. Resistances which may be connected or disconnected or else resistance networks may be suitable for the population.

According to an example embodiment of the present invention, an aspect includes classifying the hydraulic steering valve with respect to its respectively measured actual valve characteristic curve in the level of the deviation from the predefined set valve characteristic curve and, based on a family of energization characteristic curves provided on the converter side, to make an assignment which, given appropriate pairing, may furnish a best possible approach to the respective set valve characteristic curve. As based on the range in which the deviations of the measured actual valve characteristic curve from the associated set valve characteristic curve may usually lie, a family of energization characteristic curves may be predefined of which individual ones in each case cover a classified deviation range from the set valve characteristic curve, so that the deviation range from the respective set valve characteristic curve as far as the excursion limit is covered segment by segment by an appropriate energization characteristic curve for the converter, and a pairing classification is made possible, which may lead to far-reaching compensation of the respectively measured deviation from the set valve characteristic curve and, as a result, may narrow the given tolerance band substantially.

The classification, in each case determined by measurement, for the deviation on the part of the steering valve from the set valve characteristic curve is stored assigned to the steering valve, so that, following the installation of the steering valve in the vehicle and production of the electrical connection to the controller, which may be provided on the vehicle side, a pairing of respective, classified characteristic curves may be carried out automatically in an automated manner.

This is also possible in the case of an assignment predefined in hardware of energization characteristic curves, for example in an adapter plug to the converter, if, by feeding in the classification signal associated with a respective actual valve characteristic curve, the hardware configuration assigned to the corresponding energization characteristic curve is activated.

An example embodiment of the present invention includes a testing method in which, based on a predefined vehicle speed, the loading pressure corresponding to an actual valve characteristic curve is equalized to the set loading pressure by changing the current intensity of the current flowing via the actuator, and in which a corresponding calibration is carried out via the speed-dependent energization of the actuator.

According to an example embodiment of the present invention, this equalization may be carried out on the basis of one or more set valve characteristic curves predefined as a function of speed and, with regard to the respective valve characteristic curve, at one or more points, equalization at a point with regard to the respective actual valve characteristic curve to the set valve characteristic curve, in consideration of the only slight offset of the characteristic curves running substantially in the same direction, proving to be adequate as a rule and leading to an approximation to such an extent that remaining deviations which do exist may be tolerated.

If the steering valve and the associated hydraulic converter are treated as one test unit, then the energization of the converter predefined by the controller—given storage on the converter side of a converter characteristic map with the coordinates including vehicle speed, input steering torque and electrical resistance, etc.—may be varied as a function of the respectively provided input steering torque and based on the respective speed such that the set steering behavior may be achieved, that is to say, via appropriate changing of the predefined energization, the loading pressure corresponding to the set valve characteristic curve may be achieved. However, the measurement of the input steering torque needed in the case of this procedure may entail a certain amount of effort.

A simplified procedure may be provided if the valve characteristic curve is considered as the superimposition of a hydraulic and an electric characteristic curve, the hydraulic characteristic curve being considered to be predefined by the mechanical design of the valve components with their tolerances. The electrical characteristic curve is viewed as a characteristic curve dependent on the speed of travel as a result of energizing the converter. If, based on a test unit including steering valve with electro-hydraulic converter, the converter current is stored based on a given steering torque against the speed of travel when moving along the valve characteristic curve corresponding to a set steering characteristic curve, then the energization characteristic curve of the converter may already contain the correction factor which takes into account the effect of the mechanical tolerances provided in relation to the test unit. Therefore, the necessity for torque measurement may be dispensed with, and the result is a pressure loading which may approach the set valve characteristic curve closely.

This correspondence may be all the more complete the more accurately a respective set valve characteristic curve is moved over via a speed of travel, the accuracy, based on a speed-dependent set valve characteristic curve covered, being greater the greater the number of points moved to on the set valve characteristic curve.

An example embodiment of the present invention includes a method that includes making use of the largely corresponding characteristics of the speed-dependent set valve characteristic curves and also the tolerance-induced actual characteristic curves respectively provided for this purpose and, starting from this point, restricting the testing and setting method with regard to the equalization at one or more setting points of the input steering torque and, based on the respective setting point, bringing about the corresponding equalization by changing the energization of the converter at this point, under the premise that, in accordance with the largely corresponding shape of the set valve characteristic curves and also their associated, tolerance-induced actual characteristic curves, a correction based on the correction value determined point by point of the energization furnishes an adaptation of the respective actual characteristic curve to the corresponding set valve characteristic curve far-reaching improvements such that any remaining, tolerance-induced deviations may in practice no longer be noticeable as deviations in the steering behavior.

Further details and features of example embodiments of the present invention are set forth below, with reference to the appended Figures.

DETAILED DESCRIPTION

Figures 1, 2:
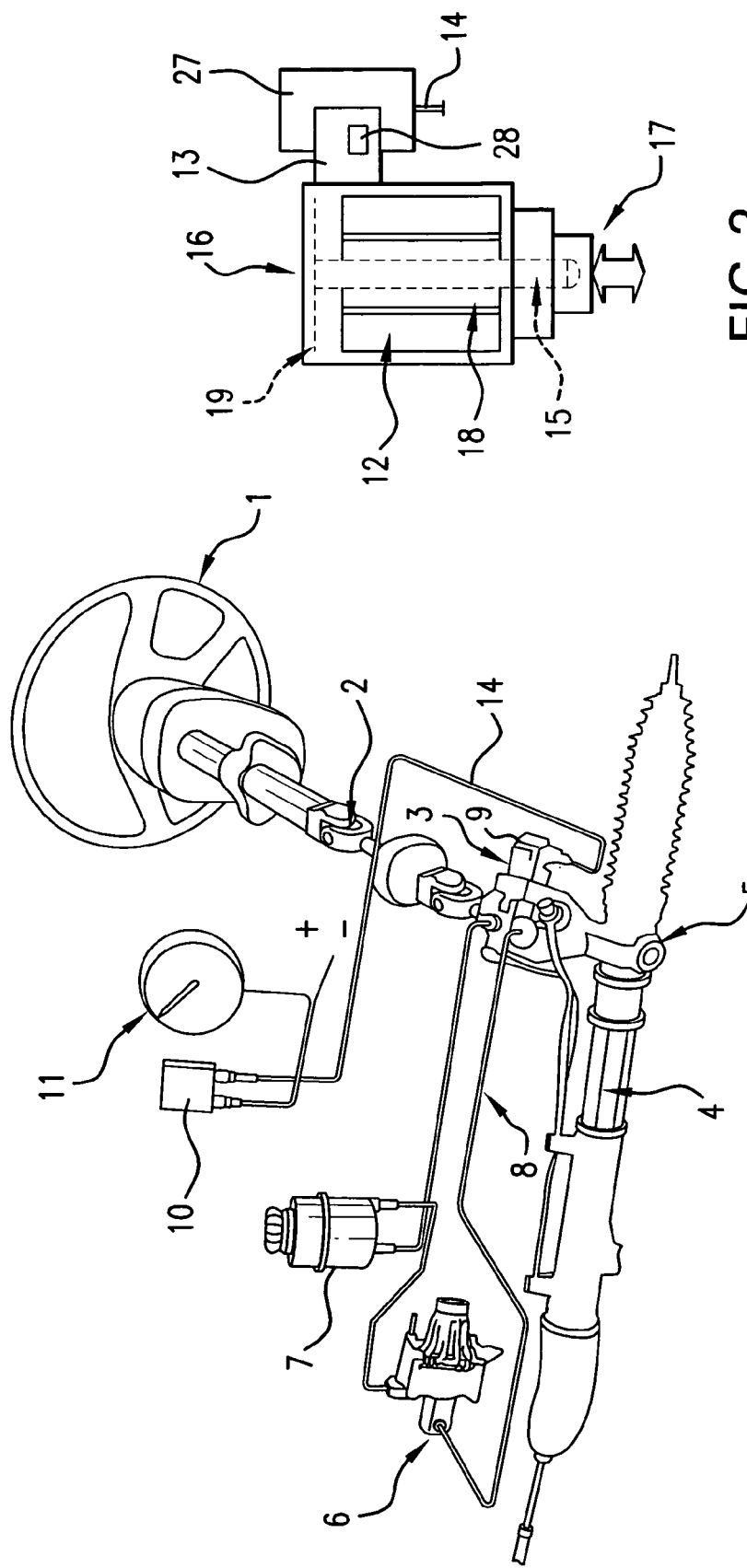
FIG. 1 illustrates, in a schematic overall view, a hydraulic servo-assisted steering system for motor vehicles, including a hydraulic, torque-dependency operating valve and an electro-hydraulic converter assigned to the latter for speed-dependent activation.
FIG. 2 is a basic illustration of an electro-hydraulic converter in very simplified form.

FIG. 1 is a schematic overall illustration of parts of a servo-assisted steering system for vehicles. Reference character 1 designates the steering wheel via which—as input torque—the respective steering commands are input by the driver. These steering commands are transmitted, with the assistance of an articulated steering shaft 2, to a hydraulic steering valve 3 which, for example, in the configuration as a rotary slide valve, drives a servo actuator 4 as a function of torque. Via the latter, the steering forces exerted on the steering wheel 1 and transmitted via the steering mechanism 5 are modulated in an assisting manner as a function of predefined parameters, for example, as a function of torque and speed.

The steering mechanism 5 in the scheme illustrated in FIG. 1 is designed as a rack and pinion steering system. The servo actuator 4 extends as a piston actuator approximately in the direction of the rack extending transversely with respect to the vehicle between the steerable wheels. The rack meshes with a pinion, which is connected to the output element of the hydraulic, torque-dependently operating steering valve 3.

The hydraulic pressure supply is provided via a pressurized oil pump 6 which, with the oil reservoir 7, is located in a hydraulic supply circuit 8 which leads via the steering valve 3 to the servo actuator 4.

Assigned to the steering valve 3 is an electro-hydraulic converter 9, via which speed-dependent, hydraulic loading of the steering valve 3 is carried out superimposed on its torque-dependent loading. The converter 9, as shown in the schematic illustration according to FIG. 2, includes a hydraulic valve 17 and an actuating magnet 16 which acts on the latter and, as shown in the overall illustration according to FIG. 1, is addressed via a controller 10. The controller 10 converts the speed of travel V registered by the tachometer 11, e.g., electronic tachometer, into actuating signals for the actuating magnet 16 of the converter 9.

Figure 3:
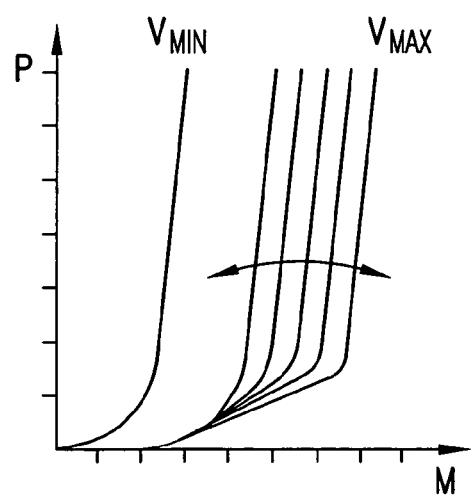
FIG. 3 illustrates a characteristic curve graph for hydraulic servo-assisted steering systems for motor vehicles as illustrated in FIG. 1 in schematic form, from which the actuating pressure acting on the servo actuator of the servo-assisted steering system results from the respective set valve characteristic curve associated with a speed by the input torque predefined on the steering wheel side.

The functions in this regard may be taken, for example, from German Published Patent Application No. 42 20 624, as may the configuration of the valve 3 as a rotary slide valve, in which the torque-dependent pressure supply of the servo actuator 4 has superimposed on it a speed-dependent actuation such that the servo action in principle decreases with increasing speed, as illustrated in FIG. 3, in which the pressure P applied to the servo actuator 4 and modulated as a function of speed by the converter 9 is plotted against the input torque M.

FIG. 3 illustrates that, at low speeds Vmin, an intense servo action is provided, and that this servo action is reduced toward the maximum speed so that, in the region of low speeds, e.g., during parking, in spite of high opposing forces, the result is soft steering, assuming only low input torques, while the steering is stiffened increasingly toward high speeds, in order to ensure a direct steering feel even under these driving conditions.

In the configuration mentioned, the steering valve 3, as a rotary slide valve, has a basic structure, e.g., in a conventional manner, in which a rotary slide fixed to the steering shaft 2 so as to rotate with it is provided and is enclosed by a steering bush which, with respect to the steering shaft 2, is supported by a torsion spring such that it may rotate to a limited extent and which is produced via the drive connection to the steering mechanism 5. With regard to the torque-superimposing, speed-dependent activation of the steering valve, the control bush may be loaded axially via the converter 9 via a reaction piston which is fixed to the rotary slide and therefore to the input shaft so as to rotate with it and which is spring-loaded in the direction of the facing end of the control bush, there being between the ends displacement elements via which, during rotation of the reaction piston with respect to the control bush, the reaction piston is displaced axially by the control bush.

As a function of the force exerted axially in the direction of the control bush via the reaction piston, this arrangement results in the possibility of influencing the rotational stiffness of the steering system since, with increasing axial loading of the displacement elements between control bush and reaction piston, a torque is built up which acts as a supplement to the torsion spring and therefore counter to the direction of rotation of the control bush via the input torque.

The force loading the reaction piston axially in the direction of the control bush may be increased as a function of speed via the converter, by the reaction piston being loaded hydraulically in the direction of the control bush. A solution of this type is described in German Published Patent Application No. 42 20 624.

In the case of another solution, described in German Published Patent Application No. 42 01 311, constructionally, by appropriate spring-loading of the reaction piston, a high axial bias of the reaction piston toward the control bush may be provided, so that, in constructional terms, stiff steering is predefined, as is the intention at higher speeds, and, via the hydraulic loading controlled by the converter, the reaction piston is displaced counter to the loading force of the spring when soft steering, e.g., steering with high servo assistance is intended, for example, in the parking range.

Such a configuration described in German Published Patent Application No. 42 20 624 is assumed for the following explanation of an example embodiment of the present invention, in which, corresponding to the high servo action at low speeds, a pressure loading is predefined via the converter 9 by appropriately high energization of the magnetic actuator 16. This therefore also means that, when the energization fails, the servo action is omitted and therefore, in hazardous speed ranges, the usual, stiff steering behavior is substantially maintained.

Figure 4:
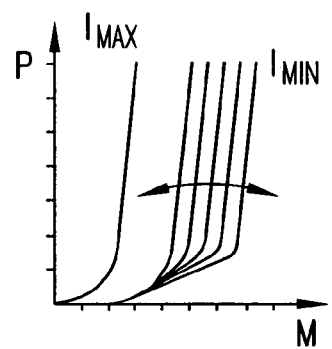
FIG. 4 is a further simplified, schematic, graphical illustration according to FIG. 3 with assignment of the respective converter energization to the set valve characteristic curves.

The schematic illustration in FIG. 3, in which the actuating pressure P which is applied as a function of an input torque M established as set valve characteristic curves, based on a constant speed in each case, reveals that, at a minimum speed Vmin lying around zero, a high servo action is provided, so that easy steering is implemented in the parking range by high servo assistance, while the steering becomes increasingly tighter toward the maximum speed Vmax FIG. 4 illustrates, highly schematically and in a manner analogous to FIG. 3, the valve characteristic curve shapes given for one speed in each case at the energization of the converter corresponding to the respective speed. The energization is greatest with Imax in the parking range and reduces toward Imin, corresponding to the maximum speed range Vmax, with decreasing servo action according to the initial situation explained above.

The speed-dependent variation which is illustrated in FIGS. 3 and 4 of the servo action dependent on the input torque M is therefore provided via appropriate energization of the actuating magnet 16 which is assigned to the converter 9, is connected via a connection 13 and a line connection 14 to the controller 10 and which has an armature 15 which passes through a coil 12 and an iron core 18 and is loaded via a spring 19 such that, when there is no energization of the actuating magnet 16, the valve 17 is open.

Figure 5:
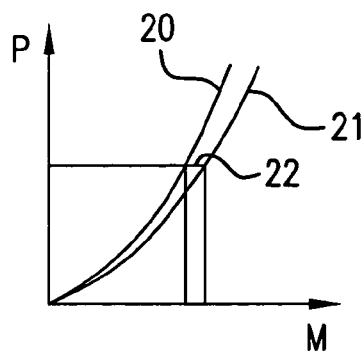
FIG. 5 illustrates a valve characteristic curve, measured during the checking of a steering valve on a test bench, in association with the corresponding set valve characteristic curve, in an illustration corresponding to FIG. 4.

The fundamentally speed-dependent energization of the actuating magnet 16 is used in order, e.g., to compensate for tolerance-induced deviations of the steering valve 3 and scatter caused by this in the steering behavior, which is illustrated schematically in FIG. 5, in which, corresponding to the illustration in FIG. 4, 20 designates a set valve characteristic curve, while at 21, an actual valve characteristic curve corresponding to the set valve characteristic curve 20 and recorded on the test bench at the conclusion of the valve assembly is illustrated. The arrow 22 indicates the correction necessary to compensate for the deviation between the actual valve characteristic curve 21 and the set valve characteristic curve 20.

Figure 6:
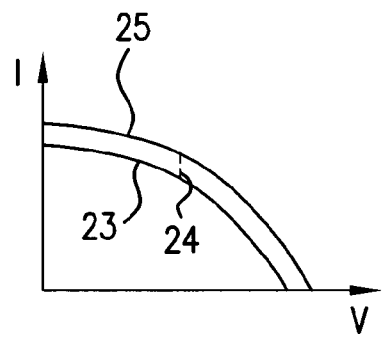
FIGS. 6 and 7 illustrate schematic characteristic maps in which the energization of the converter (energization characteristic curves) corresponding to the intended pressure variations (set valve characteristic curves) intended on the valve side or actuator side are plotted against the speed.
Figure 7:
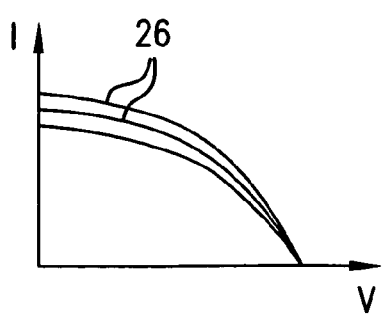

For this purpose, FIGS. 6 and 7 illustrate two possibilities, namely in FIG. 6 a general increase in the energization, e.g., the current intensity over the speed, performed in accordance with the deviation according to arrow 22, the actual valve characteristic curve 21 in FIG. 5 corresponding to an energization characteristic curve 23 which, by raising the energization according to arrow 24, is transferred into an energization characteristic curve 25 which is selected such that, on average, the result may be the best possible approach of the actual valve characteristic curve 21 to the set valve characteristic curve 20 according to FIG. 5 and the pressure variation corresponding to this. Such a general increase may be achieved by hardware, for example, by an appropriately increased current being provided by the controller or by an appropriate increase in the current flowing via the coil 12 being produced by the magnetic actuator, for example, by severing at least one resistance provided in a parallel circuit with the coil 12.

FIG. 7 illustrates a further possibility of operating with a characteristic map, of which in each case that energization characteristic curve is activated which may be suitable to adapt the measured actual situation in the best possible manner to the desired set situation by changing the current intensity.

For the practical procedure, it may be provided to register the respective test-bench result for the unit including steering valve 3 and converter 9 as an actual valve characteristic curve, to classify it with regard to the level of deviation from a predefined set valve characteristic curve and to "provide the respective classification together" with the respective assembly unit, e.g., provide it together such that they may be called up. Corresponding to the selected classification, e.g., by the controller or by the actuating magnet 16, a level of equipment is provided which, corresponding to the respective classification, leads to pairing of a corresponding, corrective energization. This pairing may be carried out in an automated manner if, during the assembly of the steering system, this is installed with the steering valve in the respective vehicle and is connected appropriately.

During the connection, the classification result which, for example, is stored in a memory module 28, as indicated schematically in FIG. 2, may be transmitted to the controller 10 or else to the adapter 27, if appropriate adaptation of the current intensity is only performed via the adapter 27.

The following description of the test-corrected and tolerance-corrected setting method for a hydraulically operating vehicle servo steering system relates to a configuration of such a servo steering system as described, for example, in German Published Patent Application No. 42 20 624, in which the steering valve provided is a rotary slide valve, which is located in the activation of a servo actuator and via which the pressure supply of the servo actuator is provided as a function of the input steering torque, as a function of the torque and, superimposed on this, as a function of speed, e.g., in principle such that the servo action decreases with increasing speed. The speed-dependent pressure component is provided via an electro-hydraulic converter, which is energized as a function of speed.

For the steering valve, various designs are possible, as illustrated, for example, in the aforementioned German Published Patent Application No. 42 20 624 and German Published Patent Application No. 42 01 311. In German Published Patent Application No. 42 20 624, the speed-dependent pressure component is used—by increasing the energization in a manner corresponding to the rising speed—to stiffen the steering, which is soft in the basic mechanical deflection at low speeds, for example in the parking range, in a manner corresponding to the rise in the speed, by increasing pressurization via the electro-hydraulic converter. German Published Patent Application No. 42 01 311 follows the converse route and provides a hard mechanical basic configuration which, in the range of lower speeds, for example in the parking range, is made soft by the pressure component provided via the electro-hydraulic converter, and in which, accordingly, in order to harden the steering toward high speeds, the pressure component provided via the electro-hydraulic converter is reduced.

Figure 8:
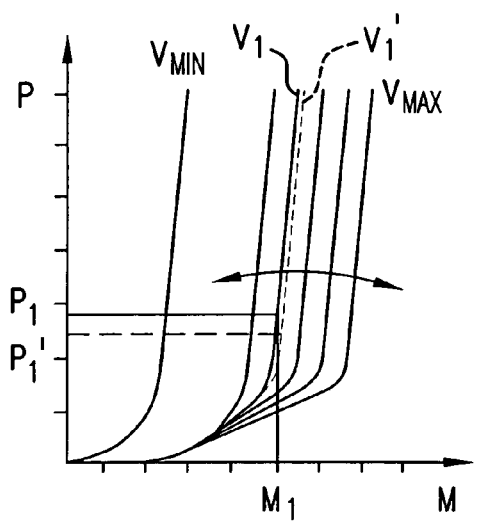
FIG. 8 illustrates a characteristic curve graph for a hydraulic servo-assisted steering system for motor vehicles in schematic form in which—as theoretical set points—the actuating pressure acting on the servo actuator of the servo-assisted steering system for associated speeds is plotted against the input torque predefined on the steering wheel side.
Figure 9:
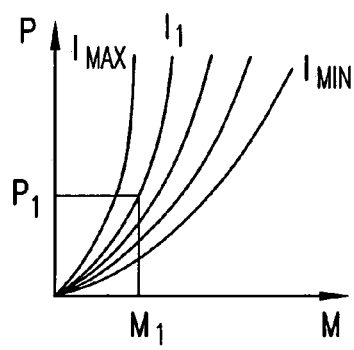
FIG. 9 illustrates, based on a graphical illustration according to FIG. 8 and accordingly in a speed-dependent manner, set valve characteristic curves with the energization stipulations correlating with the speed information according to FIG. 8 for the electro-hydraulic converter which is assigned to the steering valve of the hydraulic servo-assisted steering system.

The schematic illustration according to FIG. 9 starts from such a solution, in which, corresponding to the illustration according to FIG. 8, speed-dependent valve characteristic curves are assigned corresponding, and therefore also speed-dependent, energization stipulations, the valve characteristic curve of minimal energization corresponding to the valve characteristic curve of maximum speed, and vice versa.

Figure 11:
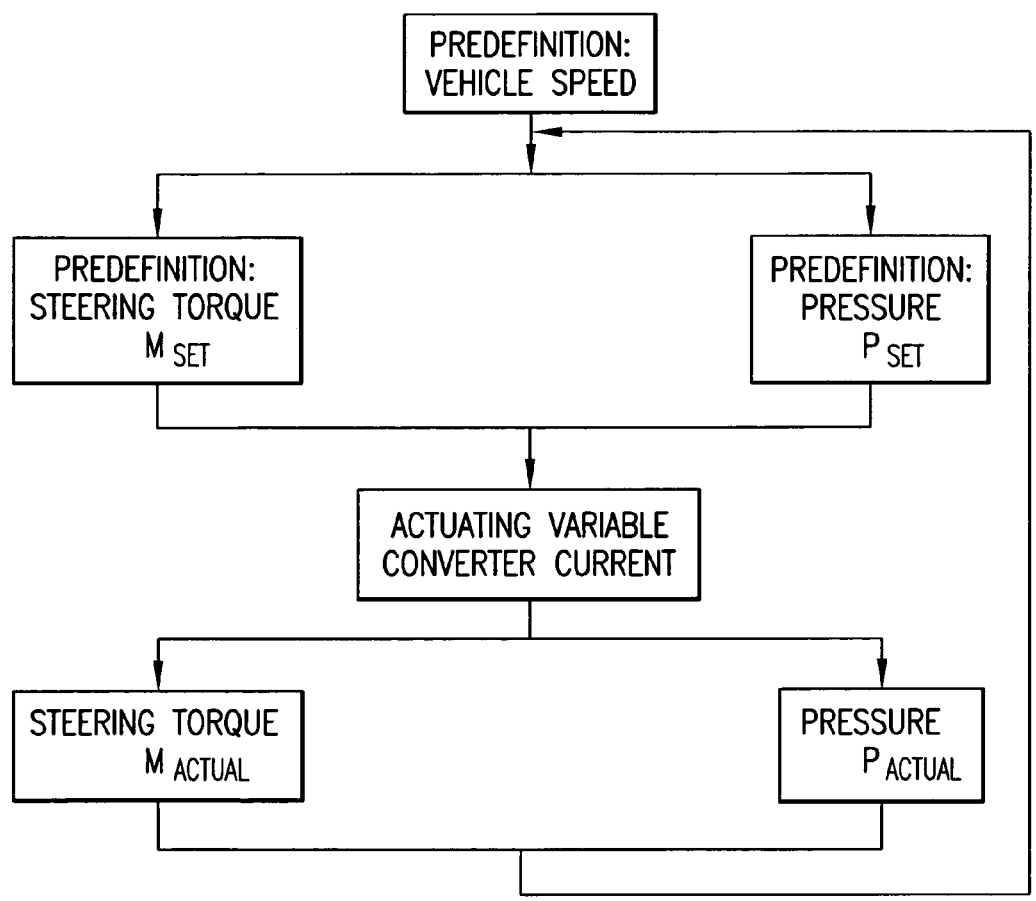
FIG. 11 is a schematic block diagram illustration of the test-bench determination of the tolerance-corrected energization characteristic curve of the converter.

For the testing and setting method according to an example embodiment of the present invention, which is shown in the scheme illustrated in FIG. 11 and which will be explained below, the speed-dependent energization of the electro-hydraulic converter is used as a starting point for the correction of tolerance-induced deviations from the (theoretical) set valve characteristic curve (FIG. 8) corresponding to the respectively predefined steering characteristic curve. The given (theoretical) loading pressure P1 of the servo actuator, based on a predefined speed of travel V1 and an input steering torque M1, as a set point is observed for deviations and any deviations are compensated for by correcting the converter current.

FIG. 8 illustrates, in dashed lines and schematically, in relation to a set valve characteristic curve V1 given on the basis of a vehicle speed V1, an actual valve characteristic curve V1' resulting from the tolerances mentioned, so that a loading pressure P1' based on the same input steering torque results.

FIG. 9 illustrates the valve characteristic curves corresponding to the set point curves, e.g., the respective (theoretical) set valve characteristic curves according to FIG. 8 with energization correlating with the respective speed, one of these characteristic curves, corresponding to the set valve characteristic curve V1 in FIG. 8, being designated 11. As illustrated, the loading pressure P therefore changes in a manner corresponding with the speed as a function of the energization of the converter corresponding to this speed and the input steering torque.

Figure 10:
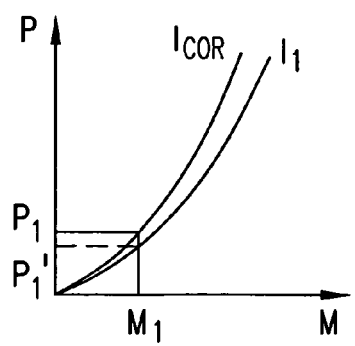
FIG. 10 shows, in an illustration corresponding to FIG. 9 but highly exaggerated, a valve characteristic curve corrected during the test-bench checking of a steering valve via the energization of the converter to a set valve characteristic curve, in order to illustrate the sequence provided in the valve test bench.

FIG. 10 illustrates that, based on the same input steering torque, the loading pressure P may be varied by changing the current intensity, for example, therefore, the tolerance-induced change in the loading pressure from P1 to P1'. in spite of an energization I1 corresponding to the set valve characteristic curve V1 may be compensated for by changing the energization of the converter, based on the illustration according to FIG. 10, by raising the current intensity I1 to a current intensity I, or which is higher than the current intensity I1 corresponding to the set valve characteristic curve V1 and which, compensating for the tolerances, guides the loading pressure back from P1, to P1.

The current flowing via the converter therefore forms and actuating variable via which, in a manner fed back to the respectively defined vehicle speed and the predefined input steering torque, a pressure loading of the servo actuator may be achieved which corresponds to the theoretical set predefinition, e.g., the set valve characteristic curve, at least to a good approximation.

An appropriate, correction, based on a respective speed of travel, may be stored for any desired speed of travel in that, in the testing method, the converter current is stored dynamically as a function of the speed of travel based on the respective set valve characteristic curve, so that in the superimposition of the energization characteristic curve on the mechanical-hydraulic actual characteristic curve provided as a function of the input steering torque, a close approximation to the theoretical set characteristic curve may be achieved.

The appropriate storage of the corrected energization value may be carried out both in the controller and also assigned to the converter, the latter representing an example embodiment of the present invention since, based on the unit including steering valve with converter, irrespective of the respective energization predefinition via the controller, the energization may be adapted individually by the converter, which may permit standardized vehicle-side presetting of the controller and compensation for inaccuracies occurring on the basis of this presetting in the respective testing unit by the correction stored on the converter side and based on this presetting, and thus this may be taken directly into account when the tested unit is mounted in the vehicle. Appropriate correction values, paired with respect to the converter, may also be downloaded to the controller, e.g., with a connection in the vehicle, in order subsequently to achieve a "corrected" energization of the converter directly via the controller.

In the extreme case, the setting and testing method according to an example embodiment of the present invention may also permit operation with only one measured point with regard to a predefined speed and transfer of the corrective change in the energization of the electro-hydraulic converter, to be performed with regard to this measured point in general in a corrective manner, to the respective valve characteristic curve, since the speed-dependent curve shapes are in principle, e.g., with regard to the curve curvature, predefined by the mechanical-hydraulic behavior of the steering valve, and the tolerance-induced deviations are relatively small and barely influence the curve shape in its characteristics.

However, it also within the scope of an example embodiment of the present invention, based on the valve characteristic curve given for a speed, to move to a plurality of measured points and to perform an appropriate calibration in an interpolating manner, so that the theoretical valve characteristic curve, e.g., the respective set valve characteristic curve, is met in a still better arrangement, a procedure of this type based on a plurality of valve characteristic curves being exemplary.

An example embodiment of the present invention therefore may provide a testing and setting method for hydraulically operating vehicle servo steering systems in which the loading pressure of the servo actuator is influenced as a function of an input steering torque and as a function of speed, the speed-dependent influence being carried out via an electro-hydraulic converter, whose energization may be set with regard to the correction of tolerances superimposed on the speed-dependent definition, so that compensation of tolerance-induced deviations from the set predefinitions may be possible with little effort.

The invention claimed is:

1. A hydraulic servo-assisted steering system for a motor vehicle, comprising:
   an electro-hydraulic converter;
   a steering-force-assisting servo actuator;
   a controller; and
   a hydraulic steering valve configured to control, as a function of torque and speed superimposed by the controller, hydraulic loading of the steering-force-assisting servo actuator by the electro-hydraulic converter;
   wherein the steering valve includes a set valve characteristic curve corresponding to a set steering behavior of the steering system, the electro-hydraulic converter including an actuating magnet configured to energize the steering valve in a manner oriented to the set valve characteristic curve, at least one of (a) the controller, (b) the electro-hydraulic converter, and (c) the actuator configured to store a plurality of energization characteristic curves assigned to the actuating magnet, an energization characteristic curve adapted to correct deviation of a respective actual valve characteristic curve from the set valve characteristic curve corresponding to the set steering behavior being connectable.

2. The hydraulic servo-assisted steering system according to claim 1, wherein the controller is configured to store the energization characteristic curves assigned to the actuating magnet.

3. The hydraulic servo-assisted steering system according to claim 1, wherein the energization characteristic curves stored by one of (a) the controller and (b) the electro-hydraulic converter are assigned to an adapter.

4. The hydraulic servo-assisted steering system according to claim 3, wherein the adapter is assigned to the actuating magnet.

5. The hydraulic servo-assisted steering system according to claim 1, wherein the respective actual valve characteristic curve of the steering valve is classified.

6. The hydraulic servo-assisted steering system according to claim 1, wherein the respective actual valve characteristic curve of the steering valve is classified with respect to a deviation from the set valve characteristic curve of the steering valve.

7. The hydraulic servo-assisted steering system according to claim 1, wherein the energization characteristic curve of the actuating magnet is classified.

8. The hydraulic servo-assisted steering system according to claim 1, wherein the energization characteristic curve of the actuating magnet is classified with respect to a deviation from the energization characteristic curve corresponding to the set valve characteristic curve.

9. The hydraulic servo-assisted steering system according to claim 1, wherein classification values corresponding to the actual valve characteristic curves and the energization characteristic curves are paired with one another.

10. The hydraulic servo-assisted steering system according to claim 1, further comprising an arrangement configured to store classification values of the actual valve characteristic curves and correspondingly corrective energization characteristic curves assigned to one of (a) the steering valve, (b) the converter and (c) the controller, to activate the classification values during mounting and to pair the classification values to call one another.

11. The hydraulic servo-assisted steering system according to claim 1, wherein the one of (a) the controller, (b) the converter, and (c) the actuator is configured to store the energization characteristic curves digitally.

12. The hydraulic servo-assisted steering system according to claim 1, further comprising an arrangement configured to vary the energization characteristic curves by connectable hardware configurations.

13. A method for a hydraulic servo-assisted steering system, comprising:
   performing hydraulic pressure loading of a servo actuator by a steering valve;
   adjusting a loading pressure corresponding to a set valve characteristic curve;
   processing vehicle speed as an input variable;
   defining the loading pressure as a function of an input steering torque and vehicle speed superimposed on the steering torque;
   acting on an electro-hydraulic converter with a current intensity that corresponds to the vehicle speed;
   equalizing based on a predefined speed of travel the loading pressure corresponding to an actual valve characteristic curve to a set loading pressure by changing the current intensity of current flowing via the electro-hydraulic converter; and
   performing a corresponding calibration in relation to speed-dependent energization of the electro-hydraulic converter.

14. The method according to claim 13, wherein the method is configured to compensate for deviations induced by production tolerances from a set steering behavior of a vehicle servo steering system.

15. The method according to claim 13, wherein the vehicle speed is processed in the processing step in a controller.

16. The method according to claim 13, further comprising equalizing the actual valve characteristic curve and the set valve characteristic curve based on the predefined speed of travel.

17. The method according to claim 13, further comprising equalizing the actual valve characteristic curve and the set valve characteristic curve based on a plurality of predefined speeds of travel.

18. The method according to claim 13, wherein the calibration is performed on a controller side.

19. The method according to claim 13, wherein the calibration is performed on a converter side.

* * * * *